(12) United States Patent
Butler

(10) Patent No.: US 10,130,115 B1
(45) Date of Patent: Nov. 20, 2018

(54) SYSTEMS AND METHODS FOR FOOD DEHYDRATION AND OPTIMIZATION OF ORGANISMAL GROWTH AND QUALITY OF ORGANISMAL PRODUCTS

(71) Applicant: Joshua Butler, Danville, CA (US)

(72) Inventor: Joshua Butler, Danville, CA (US)

(\*) Notice: Subject to any disclaimer, the term of this patent is extended or adjusted under 35 U.S.C. 154(b) by 317 days.

(21) Appl. No.: 14/847,671

(22) Filed: Sep. 8, 2015

Related U.S. Application Data

(60) Provisional application No. 62/046,513, filed on Sep. 5, 2014.

(51) Int. Cl.
    *F26B 7/00*     (2006.01)
    *A23L 3/40*     (2006.01)

(52) U.S. Cl.
    CPC ...................... *A23L 3/40* (2013.01)

(58) Field of Classification Search
    CPC .......................................................... A23L 3/40
    USPC ............................................................ 34/426
    See application file for complete search history.

(56) References Cited

U.S. PATENT DOCUMENTS

| | | | | |
|---|---|---|---|---|
| 3,257,738 A | * | 6/1966 | Margittai ................. | A23B 7/02 34/211 |
| 3,809,530 A | * | 5/1974 | Gerrans ............... | A23B 7/0205 34/195 |
| 5,001,845 A | * | 3/1991 | Norz ....................... | F26B 13/10 34/452 |

\* cited by examiner

*Primary Examiner* — John McCormack
(74) *Attorney, Agent, or Firm* — Ulmer & Berne LLP

(57) ABSTRACT

Technologies for controlling food dehydration in a low-oxygen environment include a control device and an enclosed drying chamber. The control device receives sensor data from environmental sensors disposed within the drying chamber. A concentration of oxygen within the drying chamber is determined based on the received sensor data. The control device controls a valve to selectively feed an amount of a combustible gas to a burner assembly disposed within the drying chamber. The burner assembly is ignited by the control device and a flame is produced. The flame depletes the concentration of oxygen within the drying chamber to an initial oxygen concentration level. The control device controls another valve to feed an amount of non-reactive gas into the drying chamber to flush the drying chamber and further deplete the concentration of oxygen within the drying chamber to a lower oxygen concentration level. Other embodiments are described and claimed.

12 Claims, 5 Drawing Sheets

SYSTEMS AND METHODS FOR FOOD DEHYDRATION AND OPTIMIZATION OF ORGANISMAL GROWTH AND QUALITY OF ORGANISMAL PRODUCTS

CROSS REFERENCE TO RELATED APPLICATION

This application claims the benefit of U.S. Provisional Patent Application Ser. No. 62/046,513, filed on Sep. 5, 2014, entitled, SYSTEMS AND METHODS FOR FOOD DEHYDRATION AND/OR OPTIMIZATION OF ORGANISMAL GROWTH AND/OR QUALITY OF ORGANISMAL PRODUCTS, the disclosure of which is hereby incorporated by reference in its entirety.

TECHNICAL FIELD

Embodiments of the technology relate, in general, to food dehydration technology, and in particular to low-oxygen food dehydration systems that can be capable of removing substantial amounts of water from high-value food products.

Embodiments of the technology may also relate to enhanced micro-organism or macro-organism growth and/or quality via control of gaseous and chemical growth factors.

BACKGROUND

Various techniques exist for dehydrating food products. In conventional air drying, ambient air is passed over the product at low speeds and water is removed by evaporation, a process usually accelerated by heat delivered to the product by convection. The state-of-the-art in highest-quality food drying is freeze-drying, wherein sublimation of water from a frozen food product takes place at very low pressures and temperatures. Although freeze-drying results in nutritionally superior products to conventional air drying, the extreme operating cost and powdery texture of the products are prohibitive for many applications.

While growth of most organisms in an uncontrolled air environment is generally considered sufficient for commercial production, it is not necessarily optimal for all varieties of vegetation, fungi, small animals, insects, and microorganisms such as cyanobacteria for consumption or bacterial cultures for laboratory or industrial use. Conventional sprouting and micro-farming support systems sometimes include humidity and hydration control and air circulation functionality, but often fail to include oxygen and carbon dioxide control systems capable of varying these gaseous growth factors to optimal levels for a wide range of organisms with respect to growth rates and product quality. Controlled growth environments for other types of organisms suffer from similar drawbacks, most often failing to provide access to possible optimal gaseous concentrations that vary significantly from those in ambient air. Additionally, because of these drawbacks, periodic reduction of gases needed for sustained bacterial or insect growth in order to inhibit growth of undesirable organisms is not generally implemented as a standard function in most commercial equipment intended to support growth of commercial organisms and quality of products derived from them.

SUMMARY

In an embodiment, the present disclosure is directed, in part, to a system for dehydration of food products in a low-oxygen environment, the system includes an enclosed drying chamber. The enclosed drying chamber includes a food tray, a plurality of environmental sensors, and a first burner assembly disposed therein. The system further includes a first valve in fluid communication with the first burner assembly and a combustible gas source. The system also includes a second valve in fluid communication with the enclosed drying chamber and a non-reactive gas source. Additionally, the system includes a control device communicatively coupled to the plurality of environmental sensors and the first burner assembly of the enclosed drying chamber and the first valve. The control device is configured to receive sensor data from the plurality of environmental sensors and determine a concentration of oxygen within the enclosed drying chamber based on the received sensor data. Additionally, the control device is configured to selectively control the first valve to feed an amount of a combustible gas from the combustible gas source to the first burner assembly and ignite the first burner assembly to produce a flame. The flame is to deplete the concentration of oxygen within the enclosed chamber to a first oxygen concentration level. The control device is further configured to selectively control, based on a determination that the flame of the first burner assembly is extinguished at the first oxygen concentration level, the second valve to feed an amount of non-reactive gas from the non-reactive gas source into the enclosed drying chamber to flush the enclosed drying chamber to deplete the concentration of oxygen within the enclosed chamber to a second oxygen concentration level. The second oxygen concentration level is less than the first oxygen concentration level.

In some embodiments of the system, the enclosed drying chamber further includes one or more variable-speed fans and one or more heat sources communicatively coupled to the control device. In such embodiments, the plurality of environmental sensors includes an oxygen sensor, a temperature, sensor, and a humidity sensor. Additionally, in such embodiments, wherein the control device is further configured to determine a temperature within the enclosed drying chamber based on temperature data received from the temperature sensor and at least one of (i) control a speed of the one or more variable-speed fans based on the determined temperature and (ii) control an amount of heat generated by the one or more heat sources based on the determined temperature.

In some embodiments of the system, the control device is further configured to receive at least one of a recipe and dehydration instruction. In such embodiments, to at least one of control the speed of the one or more variable-speed fans and control the amount of heat generated by the one or more heat sources based on the determined temperature includes to at least one of control the speed of the one or more variable-speed fans or control the amount of heat generated by the one or more heat sources based on the determined temperature and the at least one of the received recipe and dehydration instructions.

Additionally, in some embodiments of the system, the first burner assembly includes a flame sensor. In such embodiments, the control device is further configured to determine whether the flame of the first burner assembly is extinguished based on flame data received from the flame sensor. The system, in some embodiments, further includes a cooling component in fluid communication with the enclosed drying chamber and communicatively coupled to the control device. In such embodiments, the control device is further configured to control the cooling component to lower a temperature of at least one of a gas, a mixture of gases, and a liquid fed into the enclosed drying chamber.

In some embodiments, the system further includes a nitrogen generator in fluid communication with a compressor and communicatively coupled to the control device. In such embodiments, the system also includes a third valve in fluid communication with the enclosed drying chamber and the compressor and communicatively coupled to the control device. Additionally, in such embodiments, the non-reactive gas is nitrogen gas, the non-reactive gas source is a nitrogen gas source, and the amount of non-reactive gas fed into the enclosed drying chamber is a first amount of nitrogen gas. Further, in such embodiments, the control device is also configured to selectively control, based on a determination that the flame of the first burner assembly is extinguished, the third valve to feed a second amount of nitrogen gas generated by the nitrogen generator into the enclosed drying chamber. In such embodiments, the first and second amounts of nitrogen gas fed into the enclosed drying chamber are to flush the enclosed drying chamber to deplete the concentration of oxygen within the enclosed chamber to the second oxygen concentration level.

In some embodiments of the system, the enclosed drying chamber further includes a vacuum pump communicatively coupled to the control device the plurality of environmental sensors includes a pressure sensor. In such embodiments, the control device is further configured to determine a pressure within the enclosed drying chamber based on pressure data received from the pressure sensor and selectively control, based on the received pressure data, the vacuum pump to at least one of raise or lower the pressure within the enclosed drying chamber.

The system, in some embodiments, further includes a drying component in fluid communication with the enclosed drying chamber and communicatively coupled to the control device. In such embodiments, the system also includes a third valve in fluid communication with the enclosed drying chamber and the drying component. Additionally, in such embodiments, the control device is further configured to selectively control the third valve to feed at least one of a moisture-containing gas, a moisture-containing mixture of gases, and a moisture-containing liquid from the enclosed drying chamber into the drying component.

In some embodiments, the system further includes a third valve in fluid communication with the enclosed drying chamber and a second burner assembly. The third valve is communicatively coupled to the control device and the plurality of environmental sensors includes a first plurality of environmental sensors and the flame comprises a first flame. Additionally, in such embodiments of the system, the enclosed drying chamber includes a first internal chamber and a second internal chamber. The first internal chamber includes the food tray, the first plurality of environmental sensors, and the first burner assembly disposed therein. The second internal chamber includes a second plurality of environmental sensors, the second burner assembly, and a fourth valve disposed therein. The fourth valve is in fluid communication with the second internal chamber and an exterior of the enclosed drying chamber. The second plurality of environmental sensors, the second burner assembly, and the fourth valve are communicatively coupled to the control device. In such embodiments of the system, the control device is further configured to receive sensor data from the second plurality of environmental sensors and selectively control the third valve to feed an amount of a combustible gas from the combustible gas source to the second burner assembly. The control device is further configured to ignite the second burner assembly to produce a second flame, wherein the second flame to combust at least one of a gas, a mixture of gases, and a liquid within the enclosed drying chamber. Also, in such embodiments, the control device is configured to selectively control, based on the sensor data received from the second plurality of environmental sensors, the fourth valve to exhaust a combustion byproduct from within the enclosed drying chamber to the exterior of the enclosed drying chamber.

In some embodiments of the system, the food tray comprises a continuous processing tray device communicatively coupled to the control device and the enclosed drying chamber further includes a packaging device disposed therein. The packaging device is communicatively coupled to the control device. In such embodiments, the control device is further configured to selectively control each of the continuous processing tray devices and the packaging device based on received dehydration instructions.

In another embodiment, the present disclosure is directed, in part, to a method for controlling food dehydration in a low-oxygen environment, the method includes receiving, by a control device, sensor data from a plurality of environmental sensors disposed within an enclosed drying chamber and determining, by a control device, a concentration of oxygen within the enclosed drying chamber based on the received sensor data. The method further includes controlling, by the control device, a first valve to selectively feed an amount of a combustible gas from a combustible gas source to a first burner assembly disposed within the enclosed drying chamber. The method also includes igniting, by the control device, the first burner assembly to produce a flame, wherein the flame to deplete the concentration of oxygen within the enclosed chamber to a first oxygen concentration level. Additionally, the method includes selectively controlling, by the control device based on determining that the flame of the first burner assembly is extinguished at the first oxygen concentration level, a second valve to feed an amount of non-reactive gas from a non-reactive gas source into the enclosed drying chamber to flush the enclosed drying chamber to deplete the concentration of oxygen within the enclosed chamber to a second oxygen concentration level. The second oxygen concentration level is less than the first oxygen concentration level.

In some embodiments, the method further includes receiving, by the control device, temperature data from one or more of the plurality of environmental sensors disposed within the enclosed drying chamber. In such embodiments, the method further includes determining, by the control device, a temperature within the enclosed drying chamber based on the received temperature data. Additionally, in such embodiments, the method includes, based on the determined temperature, at least one of (i) controlling, by the control device, a speed of one or more variable-speed fans disposed within the enclosed drying chamber and (ii) controlling, by the control device, an amount of heat generated by one or more heat sources disposed within the enclosed drying chamber.

Some embodiments of the method further include receiving, by the control device, at least one of a recipe and dehydration instructions. In such embodiments, at least one of controlling the speed of the one or more variable-speed fans and controlling the amount of heat generated by the one or more heat sources based on the determined temperature includes at least one of controlling the speed of the one or more variable-speed fans and controlling the amount of heat generated by the one or more heat sources based on the determined temperature and the at least one of the received recipe and dehydration instructions.

Additionally, in some embodiments, the method further includes determining, by the control device, whether the flame of the first burner assembly is extinguished based on flame data received from a flame sensor of the first burner assembly. The method may further include controlling, by the control device, a cooling component to lower a temperature of at least one of a gas, a mixture of gases, and a liquid fed into the enclosed drying chamber.

In some embodiments of the method, the non-reactive gas is nitrogen gas, the non-reactive gas source is a nitrogen gas source, and the amount of non-reactive gas fed into the enclosed drying chamber is a first amount of nitrogen gas. In such embodiments, the method further includes controlling, by the control device and in response to determining that the flame of the first burner assembly is extinguished, a third valve to feed a second amount of nitrogen gas generated by a nitrogen generator into the enclosed drying chamber. Additionally, in such embodiments, the first and second amounts of nitrogen gas fed into the enclosed drying chamber are to flush the enclosed drying chamber to deplete the concentration of oxygen within the enclosed chamber to the second oxygen concentration level.

The method, in some embodiments, further includes receiving, by the control device, pressure data from one or more of the plurality of environmental sensors disposed within the enclosed drying chamber. In such embodiments, the method also includes determining, by the control device, a pressure within the enclosed drying chamber based on the received pressure data. Additionally, in such embodiments, the method further includes controlling, by the control device, a vacuum pump of the enclosed drying chamber to selectively at least one of raise or lower the pressure within the enclosed drying chamber. In some embodiments, the method further includes controlling, by the control device, a third valve to selectively feed at least one of a moisture-containing gas, a moisture-containing mixture of gases, and a moisture-containing liquid from the enclosed drying chamber into a drying component.

Additionally, in some embodiments of the method, the plurality of environmental sensors includes a first plurality of environmental sensors and the flame comprises a first flame. In such embodiments, the enclosed drying chamber includes a first internal chamber and a second internal chamber. The first internal chamber includes the first plurality of environmental sensors and the first burner assembly disposed therein. Additionally, in such embodiments, the method further includes receiving, by the control device, sensor data from a second plurality of environmental sensors disposed within the second internal chamber of the enclosed drying chamber and controlling, by the control device, a third valve to feed an amount of a combustible gas from the combustible gas source to a second burner assembly disposed within the second internal chamber. The method of such embodiments further includes igniting, by the control device, the second burner assembly to produce a second flame, wherein the second flame to combust at least one of a gas, a mixture of gases, and a liquid within the enclosed drying chamber and controlling, by the control device and based on the sensor data received from the second plurality of environmental sensors, a fourth valve of the second internal chamber to selectively exhaust a combustion byproduct from within the enclosed drying chamber to the exterior of the enclosed drying chamber. Additionally, in some embodiments, the method further includes receiving, by the control device, dehydration instructions and selectively controlling, by the control device and based on the received dehydration instructions, each of a continuous processing tray device and a packaging device disposed within the enclosed drying chamber.

BRIEF DESCRIPTION OF THE DRAWINGS

The present disclosure will be more readily understood from a detailed description of some example embodiments taken in conjunction with the following figures, in which.

DETAILED DESCRIPTION

Figure 1:
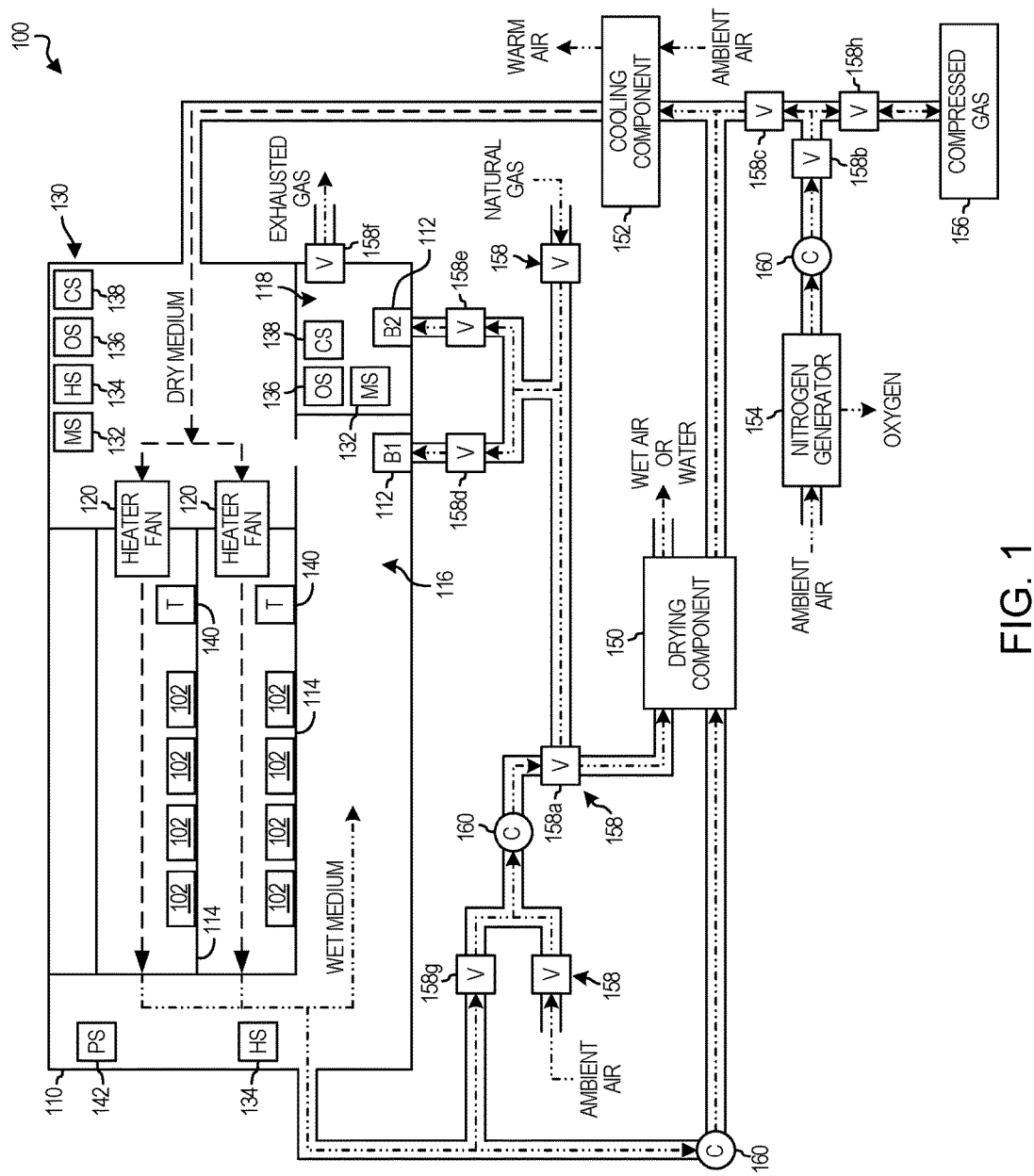
FIG. 1 is a conceptual diagram of the basic operating principles and gas flow for an example drying system according to one embodiment.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for food dehydration and/or organism growth optimization. In one example embodiment, a low-oxygen food dehydration system can be capable of removing at least 80% of water from high-value food products, comparable to air drying, while enabling fine automated or user-initiated control over all components. In some embodiments, the exposure of the food to oxygen can be reduced by a combination of combustion, flushing by natural gas and nitrogen, and oxygen absorption. In some embodiments, with the oxygen depleted, oxidation resulting from oxygen exposure can be reduced, which can better preserve vitamins and other phytochemicals of high biological value in foods that are sensitive to decomposition by oxidation. In some embodiments, oxygen and carbon dioxide levels in air may be altered to facilitate or inhibit optimal fungal, vegetative, or micro-organismal growth. In some embodiments, both growth and dehydration functionality may be integrated.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example embodiments described herein can produce high-quality raw foods that may be superior to those produced with conventional air drying while having a lower operating cost than freeze drying or nitrogen drying. Embodiments described herein can be implemented as small-, medium-, or large-scale commercial or consumer food drying systems.

The disclosed technologies can include a low-oxygen food dehydration system that is capable of removing at least 80% of water from high-value food products, comparable to air drying, while enabling fine automated or user-initiated control over some or all components. In contrast to conventional air drying, the exposure of the food to oxygen can be reduced by a combination of combustion, flushing by natural gas and nitrogen, and oxygen absorption, as discussed in more detail below. With the oxygen depleted, oxidation resulting from oxygen exposure is reduced, better preserving vitamins and other phytochemicals of high biological value in foods that are sensitive to decomposition by oxidation.

In some embodiments, the low-oxygen food dehydration system may include or otherwise integrate various features that improve performance with respect to drying speed or product quality. For example, in some embodiments, the low-oxygen food dehydration system may include one or more components or devices configured to provide, produce, and/or introduce ultrasonic pressure perturbation or modulation, pressure reduction, temperature reduction, increased air flow or air speed, nitrogen and other non-reactive gas flushing, drying surface treatment with nitrous oxide and other gases, product oxidation shielding gases, optimized fan speeds, and monitoring of the drying process by analysis of reflected light beams or CCD image analysis. Ultrasonic pressure perturbation can assist with removing vapor trapped in small cavities beneath the surface of the food products. Reduction of pressure and high-efficiency removal of water from the drying medium can increase product drying speed by reducing the partial pressure of vapor exerted on the surface of the food product by the drying medium. Continuous or intermittent injection of nitrogen, natural gas, propane, nitrous oxide, or other non-reactive gas can assist in preventing oxygen from entering the chamber by providing a positive internal pressure and potentially act as a shield to prevent oxygen present in the drying medium from reacting with food constituents.

The disclosed technologies can also include an organism growth system that is capable of optimizing and controlling an air environment for organism growth. In contrast to conventional organism growth systems, the organism growth systems disclosed herein monitor and control humidity, hydration, oxygen levels, and carbon dioxide levels in a growing chamber to facilitate or inhibit optimal fungal, vegetative, or micro-organismal growth. Additionally, in some embodiments, the organism growth systems disclosed herein include one or more components or devices configured to provide, produce, and/or introduce nutrients and water into the growth chamber. The organism growth systems disclosed herein may also include one or more components or devices configured to monitor the growth process by analysis of reflected light beams or CCD image analysis. In the event new methods for these modular processes arise with the similar functionality and better operating, maintenance, or construction cost efficiency or product quality, those methods may be incorporated into future versions and are contemplated.

Figure 2:
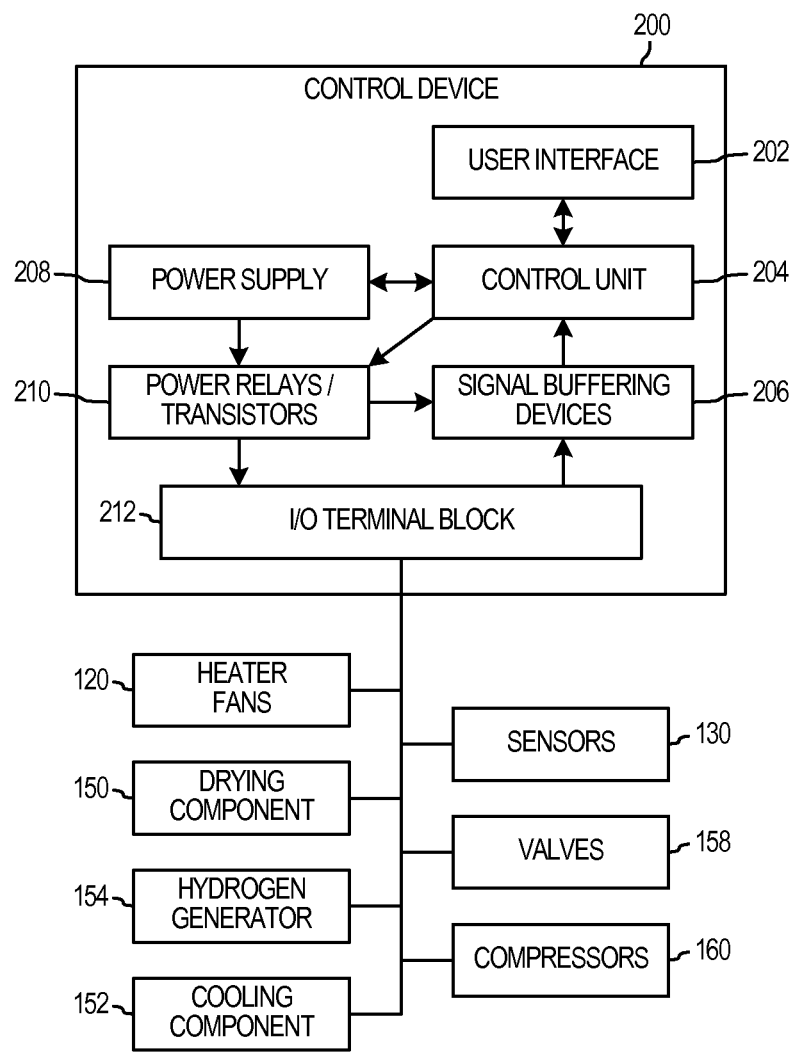
FIG. 2 is a diagram representing primary components and information and power flow for an example control system according to one embodiment.
Figure 3:
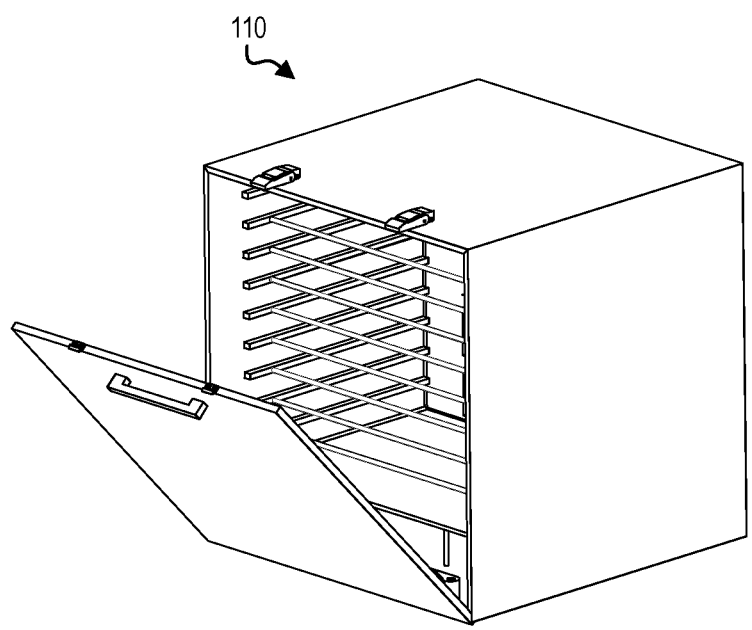
FIG. 3 is an isometric view of an example self-contained drying chamber without components according to one embodiment.

Referring now to FIGS. 1 and 2, one embodiment of a system 100 for dehydrating food products 102 in a low-oxygen environment includes an enclosed drying chamber 110 and a control device 200 (e.g., a control unit, computing device, programmable logic controller, integrated logic circuit, etc.). In some embodiments, the enclosed drying chamber 110 is an air-tight drying chamber. Additionally or alternatively, the enclosed drying chamber 110 is a BPA-free drying chamber. An example drying chamber 110 design is illustratively shown in FIG. 3.

In some embodiments, the system 100 may also include a drying component 150 (e.g., a drying membrane, a dehumidifier, a desiccant, etc.), a cooling component 152 (e.g., a semiconductor cooler, a chiller, etc.), a nitrogen generator 154 (or other non-reactive gas generator or source), a compressed gas source 156 (e.g., a non-reactive gas source, etc.), one or more valves 158 (e.g., valves 158a, 158b, 158c, 158d, 158e, 158f, 158g, 158h, and remaining valves generally, 158), and one or more compressors 160.

As illustratively shown, the drying component 150 is in fluid communication with the enclosed drying chamber 110, the cooling component 152, and one or more valves 158 and compressors 160 of the system 100. The drying component 150 may be configured to remove moisture or water from a moisture-containing gas, a moisture-containing mixture of gases, and/or a moisture-containing liquid received from the enclosed drying chamber 110. The valve(s) 158 (e.g., valve 158a) and compressor(s) 160 in fluid communication with the drying component 150 may be selectively operated or controlled to adjust the amount of moisture-containing gas, mixture of gases, and/or liquid received from the enclosed drying chamber 110. Additionally or alternatively, the valve(s) 158 and compressor(s) 160 in fluid communication with the drying component 150 may be selectively operated or controlled to adjust an amount of ambient air or other gas received by the drying component 150. Additionally, it should be appreciated that the system may regenerate low-oxygen air to reduce fuel consumption and heat generation.

The cooling component 152 is in fluid communication with the enclosed drying chamber 110, the drying component 150, and one or more valves 158 and/or compressors 160 of the system 100. The cooling component 152 may be configured to lower the temperature of at least one of a gas, a mixture of gases, and/or a liquid fed into the enclosed drying chamber 110. To do so, in some embodiments, ambient air may be passed across the cooling component 152 to lower the temperature of the gas, mixture of gases, or liquid passing therethrough. In that way, the cooling component 152 may be configured to operate as a heat exchanger. It should be appreciated, however, that the cooling component 152 may be embodied as any other type of cooling device. It should further be appreciated that the cooling component 152 can be used to minimize temperature fluctuations within the enclosed drying chamber 110 caused by the burner assemblies 112 and/or other heat sources (e.g., the heater fans 120).

The nitrogen generator 154 (or other non-reactive gas generator or source) is in fluid communication with the enclosed drying chamber 110 via the cooling component 152 and one or more of the valves 158 (e.g., valve 158b) or compressors 160. The nitrogen generator 154 may be configured to generate nitrogen from ambient air. In some embodiments, the generated nitrogen (as well as supplemental nitrogen) is used to positively pressurize the enclosed drying chamber 110 and thereby prevent oxygen from reentering the enclosed drying chamber during the drying process. In some embodiments, a byproduct of the nitrogen generation is oxygen.

The compressed gas source 156 is in fluid communication with the enclosed drying chamber 110 via the cooling component 152 and one or more of the valves 158 (e.g., valve 158c, valve 158h, etc.) or compressors 160. In the illustrative embodiment, the compressed gas source 156 is a compressed nitrogen cylinder or other nitrogen source. It should be appreciated, however, that the compressed gas source 156 may be any other type of reactive or non-reactive gas source, in other embodiments. In some embodiments, the compressed gas source 156 (e.g., the nitrogen gas source) is used to supplement the nitrogen gas generated by the nitrogen generator 154. Additionally, in some embodiments, the compressed gas source 156 is a chamber, vessel, or cylinder in fluid communication with the nitrogen generator 154 and capable of withstanding high pressures. In such embodiments, the chamber, vessel, or cylinder can be used offline to pre-concentrate nitrogen, natural gas, or other type of gas for rapid flushing of the enclosed drying chamber 110 when brought online.

The valves 158 and the compressors 160 may be any type of valve 158 or compressor 160 suitable for controlling the flow, amount, mixture, and/or pressure of gases, mixtures of gases, and/or liquids to and from the enclosed drying chamber 110, the drying component 150, the cooling component 152, the nitrogen generator 154, the compressed gas 156, the burner assemblies 112, and/or any other component of the system 100. For example, the compressor(s) 160 may be variable-flow air pumps, fans, or any other type of pump or compressor.

In some embodiments, the enclosed drying chamber 110 includes one or more food trays 114. The food trays 114 are constructed to hold or otherwise support food product(s) 102 during the dehydration/drying process. The enclosed drying chamber 110 also includes one or more environmental sensors 130 for measuring or sensing environmental conditions within the enclosed drying chamber 110. For example, in some embodiments, the enclosed drying chamber 110 can include one or more pressure sensors 142 configured to generate pressure data indicative of a pressure (or pressures) within the enclosed drying chamber 110, one or more humidity sensors 134 configured to generate humidity data indicative of humidity level within the enclosed drying chamber 110, one or more temperature sensors 140 configured to generate temperate data indicative of the temperature within the enclosed drying chamber 110, and one or more air flow sensors (not shown) configured to generate air flow data indicative of the speed or direction of an air flow within the enclosed drying chamber 110. Additionally or alternatively, the enclosed drying chamber 110 can include one or more oxygen sensors 136 configured to generate oxygen concentration level data indicative of the presence or concentration of oxygen within the enclosed drying chamber 110, one or more methane sensors 132 configured to generate methane concentration level data indicative of the presence or concentration of methane within the enclosed drying chamber 110, and one or more carbon monoxide sensors 138 configured to generate carbon monoxide concentration level data indicative of the presence or concentration of carbon monoxide within the enclosed drying chamber 110. The enclosed drying chamber 110, or a component thereof, (e.g., the burner assemblies 112) can also include a flame sensor (not shown) configured to generate flame data indicative of the presence of a flame within the enclosed drying chamber 110. Additionally, in some embodiments, the enclosed drying chamber 110 may also include an imaging sensor (not shown) configured to generate status data indicative of the drying status of a food product 102 during the dehydration/drying process.

Additionally, in some embodiments, the enclosed drying chamber 110 includes one or more carbon monoxide sensors 138 disposed on an exterior (not shown) of the enclosed drying chamber 110. In such embodiments, the carbon monoxide sensors 138 can be configured to generate carbon monoxide concentration level data indicative of the presence or concentration of carbon monoxide outside of the enclosed drying chamber 110. The carbon monoxide concentration level data can be analyzed by the control device 200 to detect leakage. In some embodiments, the control device 200 can generate one or more alerts or alarms to notify nearby users of dangerous levels of carbon monoxide. Additionally, in some embodiments, the enclosed drying chamber includes one or more disposable or regenerable carbon monoxide absorbers disposed internally or externally. The one or more disposable or regenerable carbon monoxide absorbers can be used to absorb carbon monoxide generated within the enclosed drying chamber 110 and/or carbon monoxide that leaks out of the enclosed drying chamber 110.

In the illustrative embodiment shown, the enclosed drying chamber 110 also includes one or more heater fans 120. The heater fan(s) 120 are configured to generate and control air flows, which are passed across the food product(s) 102 to be dehydrated (e.g., dried). In some embodiments, the heater fan(s) 120 include a heating element configured generate heat to facilitate dehydrating/drying the food product(s) 102. In other embodiments, the heater fan(s) 120 may be standard fans configured to only generate air flows. In such embodiments, the enclosed drying chamber 110 may include other heater elements or heat sources to generate heat and control temperature inside of the enclosed drying chamber 110. In some embodiments, the heater fan(s) 120 are variable-speed fans.

The enclosed drying chamber 110 also includes one or more burner assemblies 112. The burner assemblies 112 are each in fluid communication with a combustible gas source (e.g., a natural gas source, a propane gas source, etc.). In some embodiments, the combustible gas source is a portable propane tank to avoid gas utility dependence. In other embodiments, the combustible gas source is a natural gas utility or a methane supplier. Each burner assembly 112 can also be in fluid communication with one or more valves 158 (e.g., valves 158d and 158e), which may be selectively operated or controlled to adjust an amount of combustible gas provided. In some embodiments, the enclosed drying chamber 110 includes a first internal chamber 116 (e.g., a main internal chamber) and a second internal chamber 118. The second internal chamber 118 may be isolated or separate from the first internal chamber 116. In some embodiments, the first internal chamber 116 is in fluid communication with the second internal chamber 118 via a valve 158 (not shown) or other connection of the enclosed drying chamber 110. In such embodiments, a first burner assembly B1 is disposed within the first internal chamber 116. An amount of combustible gas can be provided to the first burner assembly B1 and ignited to produce a flame. As discussed in more detail below, the flame produced by the first burner assembly B1 can be used to deplete, reduce, and/or convert the oxygen within the enclosed drying chamber 110 via combustion (e.g., convert oxygen to carbon dioxide). In some embodiments, supplemental air can be provided in a controlled fashion to the first burner assembly B1 and/or a second burner assembly B2 to maintain a flame produced by the first burner assembly B1 and/or the second burner assembly B2 as the oxygen within enclosed drying chamber 110 is depleted to the lower limit of flammability.

In some embodiments, a second burner assembly B2 is disposed within the second internal chamber 118. An amount of combustible gas can be provided to the second burner assembly B2 and ignited to produce a flame. The flame produced by the second burner assembly B2 can be used to deplete, reduce, and/or convert combustible or reactive gases used to flush the enclosed drying chamber 110. In some embodiments, the second internal chamber 118 includes a valve 158 (e.g., valve 158f) in fluid communication with an exterior of the enclosed drying chamber 110. In such embodiments, the valve 158 (e.g., valve 158f) can be selectively operated or controlled to exhaust or vent combustion byproducts or other gases (e.g., carbon dioxide, carbon monoxide, methane, etc.) from within the enclosed drying chamber 110 to the exterior of the enclosed drying chamber 110. In some embodiments, natural gas is used to flush the enclosed drying chamber 110. In such embodiments, the natural gas used to flush the enclosed drying chamber 110 can be mixed with air within the second internal chamber 118 prior to combustion by the second burner assembly B2. Additionally, in some embodiments, the second internal chamber 118 includes one or more environmental sensors 130 (e.g., an oxygen sensor 136, a methane sensor 132, and a carbon monoxide sensor 138) configured to generate corresponding sensor data. Such sensor data can be used to determine when a certain combustion byproduct or other gas should be exhausted or vented from within the enclosed drying chamber 110 to the exterior of the enclosed drying chamber 110.

The enclosed drying chamber 110 can also include one or more disposable or regenerable oxygen absorbers (not shown) or scavengers, in some embodiments. The one or more disposable or regenerable oxygen absorbers can be used to further deplete and/or reduce the remaining oxygen within the enclosed drying chamber 110. For example, in some embodiments, the first burner assembly B1 can be used to deplete, reduce, and/or convert the oxygen within the enclosed drying chamber 110 via combustion (e.g., convert oxygen to carbon dioxide) to a first oxygen concentration level. The first oxygen concentration level can be substantially similar to the lower-limit of flammability for a flame produced by the first burner assembly B1 (e.g., around about 14.5% $O_2$), in some embodiments. When the flame produced by the first burner assembly B1 is extinguished due to lack of sufficient oxygen, the enclosed drying chamber 110 can be flushed with a non-reactive gas (e.g., nitrogen) to deplete and/or reduce the oxygen within the enclosed drying chamber 110 to a second oxygen concentration level (e.g., a trace level of oxygen) that is lower than the first oxygen concentration level. Subsequently, the oxygen absorbers can be used further reduce the remaining concentration of oxygen within the enclosed drying chamber 110 to a third oxygen concentration level (e.g., around about 0% $O_2$) that is lower than the first and second oxygen concentration levels. In some embodiments, the regenerable or disposable oxygen absorbers are isolated from the first internal chamber 116 of the enclosed drying chamber 110. Additionally, in some embodiments, the regenerable or disposable oxygen absorbers can be isolated from the first internal chamber 116 of the enclosed drying chamber 110 until the flushing is complete.

In some embodiments, the enclosed drying chamber 110 also includes a vacuum pump (not shown). In such embodiments, the vacuum pump is configured to reduce the pressure within the enclosed drying chamber 110. It should be appreciated that reducing the pressure within the enclosed drying chamber may speed drying/dehydration of the food products 102. Additionally, the enclosed drying chamber 110 may also include an air filtration system or device (not shown). The air filtration system can be configured to reduce airborne carbon ash or other undesirable byproducts during dehydration. For example, in some embodiments, the air filtration system is configured to filter carbon soot from the air to prevent contamination of the food product(s) 102 with carcinogens.

The control device 200 can be embodied as any type of controller or computer system capable of processing data, storing data, maintaining data, transferring data, and directly or indirectly communicating with and controlling the drying component 150, the cooling component 152, the nitrogen generator 154, the compressed gas source 156, the valves 158, the compressors 160, the burner assemblies 112, the environmental sensors 130, the heater fans 120, and/or other components and elements of the system 100. For example, the control device 200 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the control device 200 can be embodied as a computing device integrated with other systems or subsystems. In the illustrative embodiment of FIG. 2, the control device 200 includes a user interface 202, a control unit, signal buffering devices 206, a power supply 208, power relays/transistors 210, and an I/O terminal block 212. In some embodiments, one or more of the illustrative components can be incorporated in, or otherwise from a portion of, another component. Of course, the control device 200 can include other or additional components, sub-components, and devices, such as those commonly found in a controller and/or computer (e.g., various input/output devices), which are not illustrated in FIG. 2 for clarity of the description.

The user interface 202 may be configured to enable or a user to control, configure, and operate any of the components of the low-oxygen food dehydration system 100 (or the systems 400, 500 described below and illustratively shown in FIGS. 4 and 5). The user interface 202 may be embodied as a human-machine interface (HMI). Additionally or alternatively, the user interface 202 may include one or more components or elements configured to facilitate interaction with the system 100. For example, the user interface 102 may enable users to interact with the system 110 via keyboard entry, writing from pen, stylus, finger, or the like, with a computer mouse, or other forms of input (voice recognition, web pages, mobile applications, programs, etc.).

The control unit 204 may be embodied as a processor capable of performing the functions described herein. For example, the control unit 204 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

The power supply 208 is configured to supply power (e.g., 24V DC, 12V DC, 5V DC, etc.) to one or more components or devices of the system 100. In some embodiments, the power relays/transistors 210 are configured to facilitate the selective distribution of power to the components or devices of the system 100. It should be appreciated that other voltages and other types of power may be supplied by the power supply 208.

The I/O terminal block is configured to facilitate direct or indirect communications between the control device 200 (and components thereof) and the heater fans 120, the sensors 130, the drying component 150, the cooling component 152, the hydrogen generator 154, the valves 158, and/or the compressors 160 of the system 100. For example, in some embodiments, control and power signals can be communicated to components of the system 100 via the I/O terminal block 212. Additionally, sensor data generated by the sensors 130 may be received by the I/O terminal block 212 and forwarded to other components of the control device 200. For example, in some embodiments, received sensor data may be forwarded by the I/O terminal block 212 to the control unit 204. In some embodiments, the signal buffering devices 206 can be configured to facilitate the receipt and forwarding of the sensor data as well as other forms of data.

In operation, the control device 200 may receive sensor data the environmental sensors 130 of the enclosed drying chamber 110. In some embodiments, one or more of the environmental sensors 130 includes an oxygen sensor 136, which as discussed above, may be configured to generate oxygen concentration level data indicative of the presence or concentration of oxygen within the enclosed drying chamber 110. In such embodiments, the control device determines concentration of oxygen within the enclosed drying chamber 110 based on the received sensor data (e.g., the oxygen concentration level data).

Subsequently, the control device 200 can selectively control a valve 158 (e.g., valve 158d) in fluid communication with a burner assembly 112 disposed within the enclosed drying chamber 110 to supply or feed an amount of a combustible gas (e.g., natural gas, propane, methane, etc.) from the combustible gas source to the burner assembly 112. The control device 200 then ignites the burner assembly 112 to produce a flame. In some embodiments, the burner assembly 112 includes an ignitor or starter (e.g., a piezoelectric igniter or other suitable electric igniter or starter) configured to produce a spark, which may ignite the combustible gas being feed to the burner assembly 112. It should be appreciated that the flame produced by the burner assembly 112 will, via combustion, convert oxygen within the enclosed drying chamber 110 into carbon dioxide and, in other less optimal cases, into other gases or mixtures of gases (e.g., carbon monoxide, etc.). The flame produced by the burner assembly 112 can be maintained in order to deplete or reduce the concentration level of oxygen within the enclosed drying chamber 110 to a first oxygen concentration level. In some embodiments, the first oxygen concentration level can be substantially similar to the lower-limit of flammability (e.g., around about 14.5% O2) for the flame produced by the burner assembly 112.

Once the oxygen concentration level within the enclosed drying chamber 110 is depleted to the first oxygen concentration level, the flame produced by the burner assembly 112 will extinguish (e.g., due to lack of sufficient oxygen necessary for combustion). As such, in some embodiments, the control device 200 may determine that the flame of the burner assembly 112 is extinguished. To do so, the control device 200 may receive and analyze flame sensor data generated by a flame sensor (not shown) or another one of the environmental sensors 130 of the enclosed drying chamber 110. In response to determining that the flame of the burner assembly 112 is extinguished at the first oxygen concentration level, the control device 200 can selectively control a valve 158 (e.g., valve 158b and/or valve 158c) in fluid communication with the enclosed drying chamber 110 and a non-reactive gas source (e.g., a nitrogen gas source or other non-reactive gas source) to supply or feed an amount of a non-reactive gas (e.g., nitrogen) into the enclosed drying chamber 110. In some embodiments, the non-reactive gas source is the nitrogen generator 154. It should be appreciated that, in some embodiments, the control device 200 can also selectively control a valve 158 in fluid communication with a reactive or combustible gas source. The supplied non-reactive gas (e.g., nitrogen) can be used to flush the enclosed drying chamber 110. In doing so, the nitrogen further depletes or reduces the concentration level of oxygen within the enclosed drying chamber 110 to a second oxygen concentration level, which is lower than the first oxygen concentration level. It should be appreciated that in some embodiments, the second oxygen concentration level may be a trace level of oxygen within the enclosed drying chamber 110.

Additionally, in some embodiments, the control device 200 determines a temperature within the enclosed drying chamber 110 based on temperature data received from one or more of the environmental sensors 130 (e.g., a temperature sensor 140). In such embodiments, the control device 200 may control the speed of one or more variable-speed fans (e.g., the heater fans 120) disposed within the enclosed drying chamber 110. Additionally or alternatively, the control device 200 may control an amount of heat generated by a heat source (e.g., the heater fans 120, the burner assemblies 112, or other heat source) disposed within the enclosed drying chamber 110. The control device 200 may also be configured to receive recipe and dehydration instructions. In such cases, the control device 200 may control the speed of the variable-speed fan(s) and/or the heat source(s) disposed within the enclosed drying chamber 110 based on the determined temperature and/or received the recipe or dehydration instructions. It should be appreciated that controlling the temperature, air flow, and other environmental variables within the enclosed drying chamber 110, drying/dehydration of food products 102 placed within the enclosed drying chamber 110 can be optimized.

The control device 200 is also configured to measure and record temperature, pressure, oxygen concentration, humidity, air speed, and any other environmental data captured or generated by the environmental sensors 130 disposed within the enclosed drying chamber 110. It should be appreciated that such data can be collected without opening the enclosed drying chamber 110. In some embodiments, recorded sensor data can be used by the control device 200 to optimize current and future dehydration/drying processes.

Additionally, in some embodiments, the control device 200 is configured to directly or indirectly control the cooling component 152 to lower and/or temperature of at least one of a gas, a mixture of gases, and a liquid fed into the enclosed drying chamber 110. The control device 200 may also be configured to directly or indirectly control an amount of moisture-containing gas, a moisture-containing mixture of gases, and a moisture-containing liquid feed into the drying component 150 from the enclosed drying chamber 110. To do so, the control device 200 may control one or more valves 158 (e.g., valve 158a, valve 158g, etc.) in fluid communication with the enclosed drying chamber 110 and the drying component 150.

The control device 200 can also control a valve 158 (e.g., valve 158b, valve 158c, etc.) in fluid communication with the enclosed drying chamber 110 and a nitrogen generator 154 to selectively feed an amount of nitrogen (or other non-reactive gas) into the enclosed drying chamber 110. In some embodiments, the control device 110 can cause the nitrogen gas to be feed into the enclosed drying chamber 110 after determining that the flame of the burner assembly 112 is extinguished due to lack of sufficient oxygen for combustion (e.g., the first oxygen concentration level). As discussed above, the nitrogen gas (or other non-reactive gas) fed into the enclosed drying chamber 110 can be used to further deplete or reduce the oxygen concentration level within the enclosed drying chamber 110. Additionally, in some embodiments, the control device 200 is configured to control another valve 158 (e.g., valve 158c, valve 158h, etc.) in fluid communication with the enclosed drying chamber 110 and a non-reactive gas source (e.g., a nitrogen gas source, etc.) to selectively feed an additional amount of nitrogen gas (or other non-reactive gas) into the enclosed drying chamber 110. In some embodiments, the non-reactive gas source may be a compressed gas source 156 (e.g., a nitrogen compressed gas cylinder, etc.) to selectively feed an additional amount of nitrogen gas (or other non-reactive gas) into the enclosed drying chamber 110. It should be appreciated that the amount of nitrogen gas feed into the enclosed drying chamber 110 via the compressed gas source 156 may be used along with the nitrogen gas provided by the nitrogen generator 154 to facilitate flushing the enclosed drying chamber 110 after combustion.

The control device 200 may also be configured to determine the pressure within the enclosed drying chamber 110. To do so, the control device 200 may receive pressure data generated by one or more of the environmental sensors 130 (e.g., the pressure sensor 142) disposed within the enclosed drying chamber 110. In some embodiments, the control device 200 directly or indirectly controls a vacuum pump (not shown) to selectively raise or lower the pressure within the enclosed drying chamber 110.

Additionally, in some embodiments, the control device 200 can directly or indirectly control another burner assembly 112 (e.g., a second burner assembly B2) disposed within the enclosed drying chamber 110. In such embodiments, the enclosed drying chamber 110 may include a first internal chamber 116 or section (e.g., a main internal chamber) and a separate, isolated second internal chamber 118 or section. The second burner assembly B2 can be disposed within the second internal chamber 118 or section. The control device 200 can selectively control a valve 158 (e.g., valve 158e) in fluid communication with the second burner assembly B2 to supply or feed an amount of a combustible gas (e.g., natural gas, propane, methane, etc.) from the combustible gas source to the second burner assembly B2. The control device 200 then ignites the second burner assembly B2 to produce a flame. In some embodiments, the second burner assembly B2 includes an ignitor or starter (e.g., a piezoelectric igniter or other suitable electric igniter or starter) configured to produce a spark, which may ignite the combustible gas being feed to the second burner assembly B2. The flame produced by the second burner assembly B2 can be used to deplete, reduce, and/or convert combustible or reactive gases used to flush the enclosed drying chamber 110. In some embodiments, the second internal chamber 118 includes a valve 158 (e.g., valve 158f) in fluid communication with an exterior of the enclosed drying chamber 110. In such embodiments, the control device 200 can selectively control or operate the valve 158 (e.g., valve 158f) to exhaust or vent combustion byproducts or other gases (e.g., carbon dioxide, carbon monoxide, methane, etc.) from within the enclosed drying chamber 110 to the exterior of the enclosed drying chamber 110.

Figure 4:
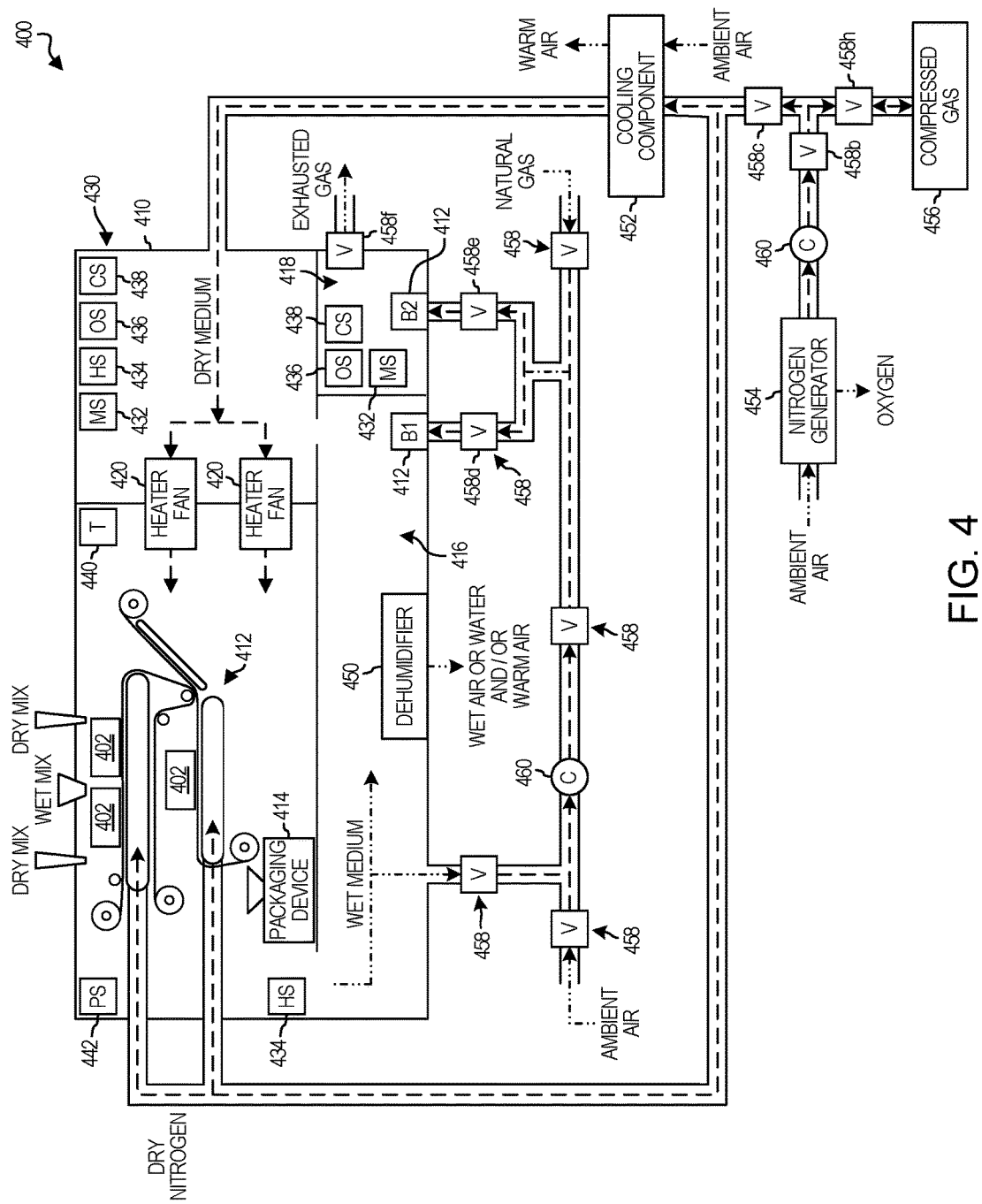
FIG. 4 is a conceptual diagram of the basic operating principles and gas flow for an example conveyor-driven drying system according to one embodiment.

Referring now to FIG. 4, one embodiment of a system 400 for continuous or batch high-volume dehydration of food products 402 in a low-oxygen environment includes the control device 200 of FIG. 2 (or a similarly constructed control device providing similar control functionality) and an enclosed batch processing drying chamber 410 constructed for continuous or batch high-volume processing of the food products 402. The enclosed batch processing drying chamber 410 can be an air-tight drying chamber.

In some embodiments, the system 400 may also include a drying component 450 (e.g., a drying membrane, a dehumidifier, a desiccant, etc.), a cooling component 452 (e.g., a semiconductor cooler, a chiller, etc.), a nitrogen generator 454 (or other non-reactive gas generator or source), a compressed gas source 456 (e.g., a non-reactive gas source, etc.), one or more valves 458 (e.g., valves 458b, 458c, 458d, 458e, 458f, 458h, and remaining valves generally, 458), and one or more compressors 460. The drying component 450, cooling component 452, nitrogen generator 454, compressed gas source 456, valve(s) 458 (including valves 458b, 458c, 458d, 458e, 458f, and 458h), and compressor(s) 460 can be substantially similar to the structure and functionality of the drying component 150, cooling component 152, nitrogen generator 154, compressed gas source 156, valve(s) 158 (including valves 158b, 158c, 158d, 158e, 158f, and 158h), and compressor(s) 160 of the system 100 illustratively shown in FIG. 1 and described in detail above. Additionally, the enclosed batch processing drying chamber 410 may include one or more environmental sensors 430 (e.g., methane sensors 432, humidity sensor(s) 434, oxygen sensor(s) 436, carbon monoxide sensor(s) 438, temperature sensor(s) 440, pressure sensor(s) 442, air flow sensor(s), flame sensor(s), imaging sensor(s), etc.) disposed therein. The environmental sensors 430 disposed within the enclosed batch processing drying chamber 410 can be substantially similar to the structure and functionality of the environmental sensors 130 of the enclosed drying chamber 110 illustratively shown in FIG. 1 and described in detail above. The enclosed batch processing drying chamber 410 can also include one or more burner assemblies 412, one or more heater fans 420, internal chambers (e.g., a first or main internal chamber 416 and a second internal chamber 418), one or more disposable or regenerable oxygen absorbers (not shown) or scavengers, and a vacuum pump (not shown), each of which can be substantially similar in structure and functionality to the burner assemblies 112, heater fan(s) 120, first internal chamber 116, second internal chamber 118, disposable or regenerable oxygen absorber(s) or scavenger(s), and vacuum pump illustratively shown in FIG. 1 and/or described in detail above.

In the illustrative embodiment of the system 400, the enclosed batch processing drying chamber 410 includes a conveyor device 412 or a continuous processing tray device disposed therein. The conveyor device 412 can be configured or constructed to move or transport food products 402 within the enclosed batch processing drying chamber 410 during the low-oxygen dehydration/drying process. In some embodiments, the enclosed batch processing drying chamber 410 also includes a packaging device 414 (e.g., a minimal-oxygen packaging system) configured to receive processed (e.g., dehydrated, dried, etc.) food products 402 and subsequently package them in a container or package. In doing so, degradation of the processed food product 402 may be minimized after the dehydration/drying process. Additionally, in some embodiments, the enclosed batch processing drying chamber 410 includes a dehumidifier 450 configured to remove moisture or water from a moisture-containing gas, a moisture-containing mixture of gases, and/or a moisture-containing liquid within the enclosed batch processing drying chamber 410. In the system 400, the control device 200 can be configured to selectively control the conveyor device 412 and the packaging device 414 based on received dehydration instructions or a recipe.

Figure 5:
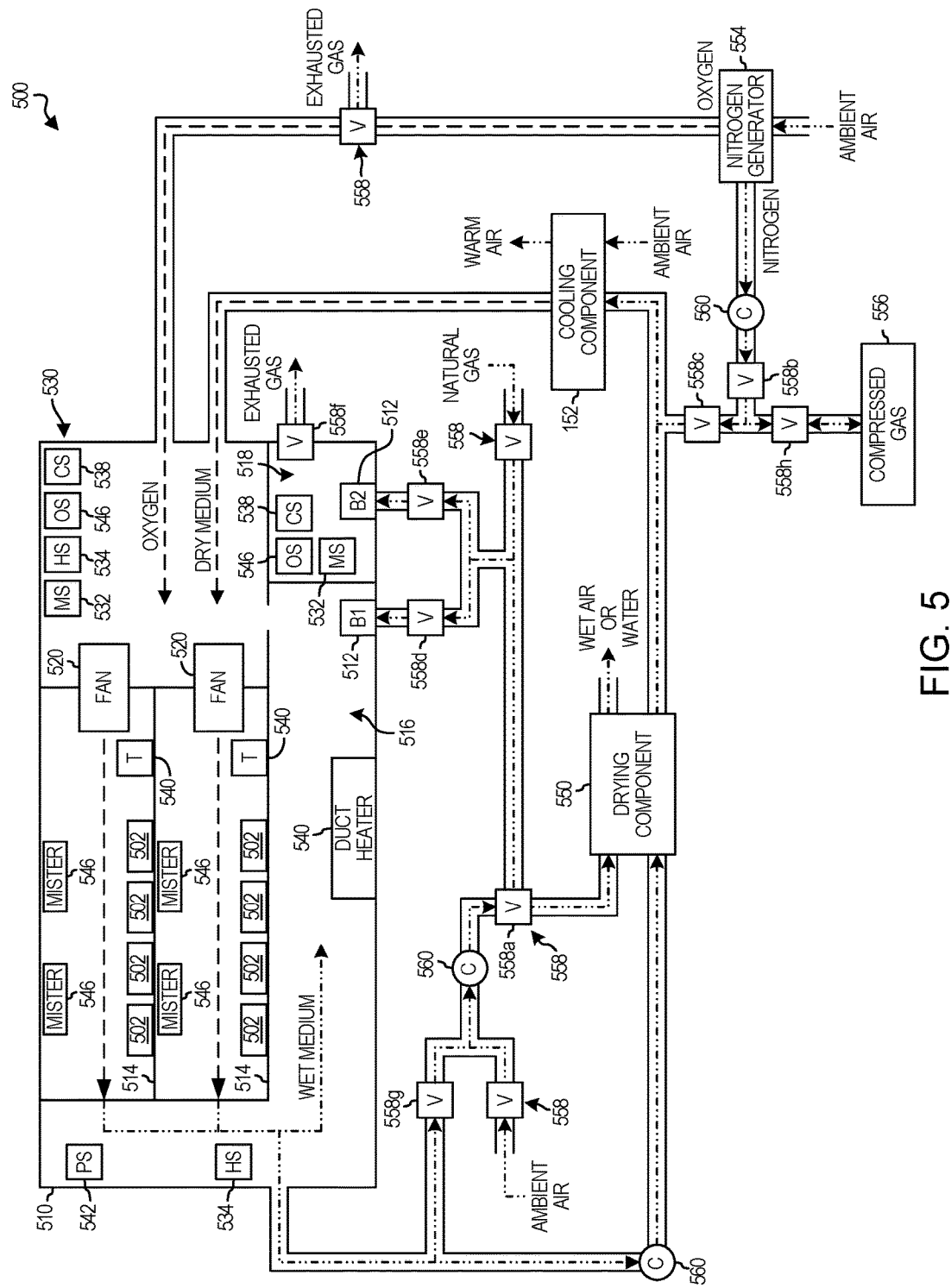
FIG. 5 is a conceptual diagram of the basic operating principles and gas flow for an example self-contained sprouting or micro-farm according to one embodiment.

Referring now to FIG. 5, one embodiment of a system 500 for growth of organisms 502 includes the control device 200 of FIG. 2 (or a similarly constructed control device providing similar control functionality) and an enclosed growth chamber 510. The system 500, via the control device 200, is configured to optimize environmental growth factors for maximized vegetative, fungal, animal, or microbial growth and/or quality of products harvested from these organisms. In some embodiments, the enclosed growth chamber 510 may include a growth medium, a water/nutrient delivery system, tubing, nozzles, pumps, and filters for delivery of water and nutrients for organism life support and to facilitate or inhibit growth. The growth medium may be any suitable growth medium capable of providing structural and/or nutritional support. The water/nutrient delivery system may be configured to provide controlled delivery of chemical growth factors such as those contained in fertilizers.

The enclosed growth chamber 510 is constructed to support monitoring and control of environmental growth factors. In some embodiments, the system 500 may also include a drying component 550 (e.g., a drying membrane, a dehumidifier, a desiccant, etc.), a cooling component 552 (e.g., a semiconductor cooler, a chiller, etc.), a nitrogen generator 554 (or other non-reactive gas generator or source), a compressed gas source 556 (e.g., a non-reactive gas source, etc.), one or more valves 558 (e.g., valves 558a, 558b, 558c, 558d, 558e, 558f, 558g, 558h, and remaining valves generally, 558), and one or more compressors 560. The drying component 550, cooling component 552, nitrogen generator 554, compressed gas source 556, valve(s) 558 (including valves 558a, 558b, 558c, 558d, 558e, 558f, 558g, and 558h), and compressor(s) 560 can be substantially similar to the structure and functionality of the drying component 150, cooling component 152, nitrogen generator 154, compressed gas source 156, valve(s) 158 (including valves 158a, 158b, 158c, 158d, 158e, 158f, 158g, and 158h), and compressor(s) 160 of the system 100 illustratively shown in FIG. 1 and/or described in detail above. Additionally, the enclosed growth chamber 510 may include one or more environmental sensors 530 (e.g., methane sensors 532, humidity sensor(s) 534, oxygen sensor(s) 536, carbon monoxide sensor(s) 538, temperature sensor(s) 540, pressure sensor(s) 542, air flow sensor(s), flame sensor(s), imaging sensor(s), etc.) disposed therein. The environmental sensors 530 disposed within the enclosed growth chamber 510 can be substantially similar to the structure and functionality of the environmental sensors 130 of the enclosed drying chamber 110 illustratively shown in FIG. 1 and described in detail above. The enclosed growth chamber 510 can also include one or more burner assemblies 512, one or more fans 520, internal chambers (e.g., a first or main internal chamber 516 and a second internal chamber 518), one or more disposable or regenerable oxygen absorbers (not shown) or scavengers, and a vacuum pump (not shown), each of which can be substantially similar in structure and functionality to the burner assemblies 112, fan(s) 120, first internal chamber 116, second internal chamber 118, disposable or regenerable oxygen absorber(s) or scavenger(s), and vacuum pump illustratively shown in FIG. 1 and/or described in detail above.

In the illustrative embodiment of the system 500, the enclosed growth chamber 510 includes one or more growth trays 514. The growth trays 514 are constructed to hold or otherwise support organisms 502 during the growth process. In some embodiments, the growth trays 514 include, or are otherwise embodied as, the growth medium. Additionally, the enclosed growth chamber 510 may include one or more misters 546 or any other suitable nutrient/water delivery device. The mister(s) 546 can be configured to selectively provide water, nutrients, and/or chemical growth factors (e.g., fertilizers) to optimize growth conditions for the organisms 502 within the enclosed growth chamber 510. The enclosed growth chamber 510 may also include a duct heater 540, which can be configured to generate heat and control the temperature inside of the enclosed growth chamber 510. In the system 500, the control device 200 can be configured to selectively control one or more of the components of the enclosed growth chamber 510 or, more generally, the system 500 to optimize environmental and growing conditions within the enclosed growth chamber 510 to facilitate or inhibit the growth of certain organisms 502. For example, in some embodiments, the control device 200 is configured to periodically control (e.g., based on sensor data or manual intervention) components of the system 500 in order to exhaust or reduce gases within the enclosed growth chamber 510 and thereby prevent certain organisms from persisting. In another embodiment, the control device 200 is configured to periodically control (e.g., based on sensor data or manual intervention) components of the system 500 in order to feed or increase gases within the enclosed growth chamber 510 and thereby promote growth of certain organisms. Additionally, in some embodiments, the control device 200 is configured to track, measure, and record organism growth. Such tracking and measurement data can be presented to an operator of a computing device or control system as log data and/or images.

In some embodiments, the systems 100, 400, 500 includes a computer system (not shown) communicatively coupled to the control device 200. In such embodiments, the computer system can be used to access (e.g., configure, query, or otherwise interact) the control device 200 via any suitable technique, such as a web-browser such as SAFARI, OPERA, GOOGLE CHROME, INTERNET EXPLORER, or the like executing on the computer device. In some embodiments, any suitable computer device can be used to access, or execute, the control device 200, such as laptop computers, desktop computers, smart phones, tablet computers, gaming systems, human-machine interfaces (HMIs), and the like.

Interaction with the computer system may include, without limitation, keyboard entry, writing from pen, stylus, finger, or the like, with a computer mouse, or other forms of input (voice recognition, etc.). The user interface of the computer system may be presented on a tablet, desktop, phone, or the like. In one embodiment, the user may interact with a user interface by writing with a smart pen on normal paper, modified paper, or a hard flat surface of their preference. In this embodiment, the user may receive real-time feedback, or at least near real-time feedback, or may synchronize with a computer system at a later date. The computer system can be a personal computer or one or multiple computers in a server-type system.

Additionally, it should be appreciated that, in some embodiments, one or more of the components and/or elements of the systems 100, 400, 500 may be embodied as passive components and/or elements, which may be preferred for reasons of efficiency. In other embodiments, one or more of the components and/or elements of the systems 100, 400, 500 may be embodied as active components and/or elements (e.g., the compressors 160, 460, 560, the valves 158, 458, 558, etc.), which may be preferred for reasons of maximizing processing time efficiency, controlling product cost, and/or controlling product quality. Of course, in other embodiments, the components and/or elements of the systems 100, 400, 500 may include a combination of passive and active components and/or elements.

In some embodiments, the systems 100, 400, 500 includes a computer system (not shown) communicatively coupled to the control device 200. In such embodiments, the computer system can be used to access (e.g., configure, query, or otherwise interact) the control device 200 via any suitable technique, such as a web-browser such as SAFARI, OPERA, GOOGLE CHROME, INTERNET EXPLORER, or the like executing on the computer device. In some embodiments, any suitable computer device can be used to access, or execute, the control device 200, such as laptop computers, desktop computers, smart phones, tablet computers, gaming systems, human-machine interfaces (HMIs), and the like.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (non-volatile) memory, an optical disc, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disc drives, or hard disk drives. A computer-readable medium can also include memory storage that is physical, virtual, permanent, temporary, semi-permanent, and/or semi-temporary.

A "computer," "control unit," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disc, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signal.

In various embodiments disclosed herein, a single component can be replaced by multiple components and multiple components can be replaced by a single component to perform a given function or functions. Except where such substitution would not be operative, such substitution is within the intended scope of the embodiments.

Some of the figures may include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

Rather it is hereby intended the scope of the invention to be defined by the claims appended hereto.

The invention claimed is:

1. A method for controlling food dehydration in a low-oxygen environment, the method comprising:
   receiving, by a control device, sensor data from a plurality of environmental sensors disposed within an enclosed drying chamber;
   determining, by the control device, a concentration of oxygen within the enclosed drying chamber based on the received sensor data;
   controlling, by the control device, a first valve to selectively feed an amount of a combustible gas from a combustible gas source to a first burner assembly disposed within the enclosed drying chamber;
   igniting, by the control device, the first burner assembly to produce a flame, wherein the flame depletes the concentration of oxygen within the enclosed drying chamber to a first oxygen concentration level; and
   based on determining that the flame of the first burner assembly is extinguished at the first oxygen concentration level, selectively controlling, by the control device, a second valve to feed an amount of non-reactive gas from a non-reactive gas source into the enclosed drying chamber to flush the enclosed drying chamber to deplete the concentration of oxygen within the enclosed drying chamber to a second oxygen concentration level, the second oxygen concentration level being less than the first oxygen concentration level.

2. The method claim 1, further comprising determining, by the control device, whether the flame of the first burner assembly is extinguished based on flame data received from a flame sensor of the first burner assembly.

3. The method of claim 1, wherein the non-reactive gas is nitrogen gas, the non-reactive gas source is a nitrogen gas source, and the amount of non-reactive gas fed into the enclosed drying chamber is a first amount of nitrogen gas; and further comprising:
   controlling, by the control device and in response to determining that the flame of the first burner assembly is extinguished, a third valve to feed a second amount of nitrogen gas generated by a nitrogen generator into the enclosed drying chamber; and
   wherein the first and second amounts of nitrogen gas are fed into the enclosed drying chamber to flush the enclosed drying chamber to deplete the concentration of oxygen within the enclosed drying chamber to the second oxygen concentration level.

4. The method of claim 1, further comprising:
   receiving, by the control device, pressure data from one or more of the plurality of environmental sensors disposed within the enclosed drying chamber;
   determining, by the control device, a pressure within the enclosed drying chamber based on the received pressure data;
   controlling, by the control device, a vacuum pump of the enclosed drying chamber to selectively at least one of raise or lower the pressure within the enclosed drying chamber.

5. The method of claim 1, wherein the plurality of environmental sensors comprise a first plurality of environmental sensors and the flame comprises a first flame;
   wherein the enclosed drying chamber comprises a first internal chamber and a second internal chamber, the first internal chamber comprises the first plurality of environmental sensors and the first burner assembly disposed therein; and further comprising:
   receiving, by the control device, sensor data from a second plurality of environmental sensors disposed within the second internal chamber of the enclosed drying chamber;
   controlling, by the control device, a third valve to feed an amount of a combustible gas from the combustible gas source to a second burner assembly disposed within the second internal chamber;
   igniting, by the control device, the second burner assembly to produce a second flame, wherein the second flame to combust at least one of a gas, a mixture of gases, and a liquid within the enclosed drying chamber;
   controlling, by the control device and based on the sensor data received from the second plurality of environmental sensors, a fourth valve of the second internal chamber to selectively exhaust a combustion byproduct from within the enclosed drying chamber to the exterior of the enclosed drying chamber.

6. The method of claim 1, further comprising:
   receiving, by the control device, dehydration instructions; and
   selectively controlling, by the control device and based on the received dehydration instructions, each of a continuous processing tray device and a packaging device disposed within the enclosed drying chamber.

7. A low-oxygen food dehydration system, the system comprising:
   an enclosed drying chamber, the enclosed drying chamber comprising a food tray, a plurality of environmental sensors, and a first burner assembly disposed therein;
   a first valve in fluid communication with the first burner assembly and a combustible gas source;
   a second valve in fluid communication with the enclosed drying chamber and a non-reactive gas source;
   a control device communicatively coupled to the plurality of environmental sensors, the first burner assembly of the enclosed drying chamber, the first valve, and the second valve, and wherein the control device is configured to:
   receive sensor data from the plurality of environmental sensors;
   determine a concentration of oxygen within the enclosed drying chamber based on the received sensor data;
   selectively control the first valve to feed an amount of a combustible gas from the combustible gas source to the first burner assembly;
   ignite the first burner assembly to produce a flame, wherein the flame depletes the concentration of oxygen within the enclosed drying chamber to a first oxygen concentration level; and
   based on a determination that the flame of the first burner assembly is extinguished at the first oxygen concentration level, selectively control the second valve to feed an amount of non-reactive gas from the non-reactive gas source into the enclosed drying chamber to flush the enclosed drying chamber to deplete the concentration of oxygen within the enclosed drying chamber to a second oxygen concentration level, the second oxygen concentration level being less than the first oxygen concentration level.

8. The low-oxygen food dehydration system of claim 7, wherein the first burner assembly comprises a flame sensor; and wherein the control device is further configured to determine whether the flame of the first burner assembly is extinguished based on flame data received from the flame sensor.

9. The low-oxygen food dehydration system of claim 7, further comprising:
   a nitrogen generator in fluid communication with a compressor and communicatively coupled to the control device;
   a third valve in fluid communication with the enclosed drying chamber and the compressor and communicatively coupled to the control device;
   wherein the amount of non-reactive gas is nitrogen gas, the non-reactive gas source is a nitrogen gas source, and the amount of non-reactive gas fed into the enclosed drying chamber is a first amount of nitrogen gas; and
   wherein the control device is further configured to:
      based on a determination that the flame of the first burner assembly is extinguished, selectively control the third valve to feed a second amount of nitrogen gas generated by the nitrogen generator into the enclosed drying chamber; and
      wherein the first and second amounts of nitrogen gas are fed into the enclosed drying chamber to flush the enclosed drying chamber to deplete the concentration of oxygen within the enclosed drying chamber to the second oxygen concentration level.

10. The low-oxygen food dehydration system of claim 7, wherein the enclosed drying chamber further comprises a vacuum pump communicatively coupled to the control device;
   wherein the plurality of environmental sensors comprise a pressure sensor; and
   wherein the control device is further configured to:
      determine a pressure within the enclosed drying chamber based on pressure data received from the pressure sensor; and
      based on the received pressure data, selectively control the vacuum pump to at least one of raise or lower the pressure within the enclosed drying chamber.

11. The low-oxygen food dehydration system of claim 7, further comprising:
   a third valve in fluid communication with the enclosed drying chamber and a second burner assembly, the third valve is communicatively coupled to the control device;
   wherein the plurality of environmental sensors comprise a first plurality of environmental sensors and the flame comprises a first flame;
   wherein the enclosed drying chamber comprises a first internal chamber and a second internal chamber, the first internal chamber comprises the food tray, the first plurality of environmental sensors, and the first burner assembly disposed therein, and the second internal chamber comprises a second plurality of environmental sensors, the second burner assembly, and a fourth valve disposed therein, wherein the fourth valve is in fluid communication with the second internal chamber and an exterior of the enclosed drying chamber, and wherein the second plurality of environmental sensors, the second burner assembly, and the fourth valve are communicatively coupled to the control device; and
   wherein the control device is further configured to:
      receive sensor data from the second plurality of environmental sensors;
      selectively control the third valve to feed an amount of a combustible gas from the combustible gas source to the second burner assembly;
      ignite the second burner assembly to produce a second flame, wherein the second flame to combust at least one of a gas, a mixture of gases, and a liquid within the enclosed drying chamber;
      based on the sensor data received from the second plurality of environmental sensors, selectively control the fourth valve to exhaust a combustion byproduct from within the enclosed drying chamber to the exterior of the enclosed drying chamber.

12. The low-oxygen food dehydration system of claim 7, wherein the food tray comprises a continuous processing tray device communicatively coupled to the control device;
   wherein the enclosed drying chamber further comprises a packaging device disposed therein, the packaging device is communicatively coupled to the control device; and
   wherein the control device is further configured to selectively control each of the continuous processing tray device and the packaging device based on received dehydration instructions.

* * * * *